United States Patent
Weber et al.

(10) Patent No.: US 10,303,868 B2
(45) Date of Patent: May 28, 2019

(54) SECURE USER AUTHENTICATION FOR BLUETOOTH ENABLED COMPUTER STORAGE DEVICES

(71) Applicant: Kingston Digital, Inc., Fountain Valley, CA (US)

(72) Inventors: Mark P. Weber, Oakdale, MN (US); Preetham Varghese, White Bear Lake, MN (US); Kevin Peter Vlasich, Lino Lakes, MN (US); David Alan Myers, Broomfield, CO (US); David Blake Farmer, Louisville, CO (US); David Paul Duncan, Boulder, CO (US)

(73) Assignee: Kingston Digital, Inc., Fountain Valley, CA (US)

( * ) Notice: Subject to any disclaimer, the term of this patent is extended or adjusted under 35 U.S.C. 154(b) by 0 days.

(21) Appl. No.: 13/728,000

(22) Filed: Dec. 27, 2012

(65) Prior Publication Data

US 2013/0174252 A1   Jul. 4, 2013

Related U.S. Application Data

(60) Provisional application No. 61/583,878, filed on Jan. 6, 2012, provisional application No. 61/581,313, filed on Dec. 29, 2011.

(51) Int. Cl.
*G06F 21/00* (2013.01)
*G06F 21/35* (2013.01)
(Continued)

(52) U.S. Cl.
CPC .......... *G06F 21/35* (2013.01); *G06F 21/6218* (2013.01); *H04L 63/0853* (2013.01); *H04L 2463/082* (2013.01); *H04W 12/06* (2013.01)

(58) Field of Classification Search
CPC ... G06F 21/35; G06F 21/44; G06F 2221/2129
See application file for complete search history.

(56) References Cited

U.S. PATENT DOCUMENTS

| 5,491,791 A | 2/1996 | Glowny et al. |
| 6,874,087 B1 | 3/2005 | Fetkovich et al. |

(Continued)

FOREIGN PATENT DOCUMENTS

EP   1255383 A2   11/2002

OTHER PUBLICATIONS

Roving Networks, "Roving Networks Bluetooth™ Product User Manual" Advanced User Manual, rn-bluetooth-um Version 4.77 Nov. 21, 2009.*

(Continued)

*Primary Examiner* — John B King
(74) *Attorney, Agent, or Firm* — Dorsey & Whitney LLP

(57) ABSTRACT

A storage device may be operably coupleable with a host computing device, and the storage device and/or host computing device may be Bluetooth enabled. The storage device may include authentication information. Access to the storage device may be permitted via Bluetooth communication between the Bluetooth enabled device and at least one of the storage device and a host computing device, wherein the Bluetooth enabled device may be within a maximum Bluetooth range of the storage device. The Bluetooth communication may be performed without Bluetooth pairing.

45 Claims, 5 Drawing Sheets

(51) Int. Cl.
*G06F 21/62* (2013.01)
*H04W 12/06* (2009.01)
*H04L 29/06* (2006.01)

(56) References Cited

U.S. PATENT DOCUMENTS

| | | | |
|---|---|---|---|
| 8,045,961 B2 | 10/2011 | Ayed et al. | |
| 8,214,890 B2 | 7/2012 | Kirovski et al. | |
| 2002/0141586 A1 | 10/2002 | Margalit et al. | |
| 2002/0197956 A1* | 12/2002 | Annola | H04W 76/02 455/41.1 |
| 2005/0235163 A1 | 10/2005 | Forlenza et al. | |
| 2005/0266798 A1* | 12/2005 | Moloney | H04L 63/0435 455/41.2 |
| 2006/0173980 A1 | 8/2006 | Kobayashi et al. | |
| 2007/0039049 A1 | 2/2007 | Kupferman et al. | |
| 2007/0143210 A1 | 6/2007 | Yeung et al. | |
| 2007/0261118 A1 | 11/2007 | Lu | |
| 2007/0279227 A1* | 12/2007 | Juels | H04L 63/0492 340/572.1 |
| 2007/0286133 A1* | 12/2007 | Kirke | H04L 63/101 370/338 |
| 2008/0276098 A1* | 11/2008 | Florencio | G06F 21/46 713/183 |
| 2009/0106561 A1* | 4/2009 | Ejiri | G06F 21/62 713/193 |
| 2009/0113128 A1 | 4/2009 | Zhao | |
| 2009/0165132 A1 | 6/2009 | Jain et al. | |
| 2009/0194596 A1 | 8/2009 | Kimura et al. | |
| 2011/0093958 A1 | 4/2011 | Devictor | |
| 2011/0106709 A1 | 5/2011 | Puura et al. | |
| 2011/0131408 A1 | 6/2011 | Cook et al. | |
| 2011/0195665 A1* | 8/2011 | Friedlaender | G08C 17/02 455/41.2 |
| 2011/0243375 A1 | 10/2011 | Rhoads | |
| 2011/0289106 A1 | 11/2011 | Rankin, Jr. et al. | |
| 2012/0072778 A1 | 3/2012 | Fuchs et al. | |

OTHER PUBLICATIONS

Bluetooth® Special interest group, "Specification Adopted Documents" URL: https://www.bluetooth.org/en-us/specification/adopted-specifications retrieved Sep. 19, 2014.*
Bluetooth, S. I. G. "The Bluetooth Core specification, v4. 0." Bluetooth SIG: San Jose, CA, USA (2010).*
Flash drive. Dictionary.com. Dictionary.com Unabridged. Random House, Inc. http://www.dictionary.com/browse/flash-drive (accessed: Oct. 30, 2017).*
Pending U.S. Appl. No. 13/727,891, filed Dec. 27, 2012.
Pending U.S. Appl. No. 13/838,240, filed Mar. 15, 2013.
United States Patent and Trademark Office, TESS record for the mark "Bluetooth" filed Feb. 19, 1999 (obtained Nov. 17, 2014).
Roving Networks, Wireless for Less, Advanced User Manual "Roving Networks BluetoothTM Product User Manual" from <www.rovingnetworks.com> Nov. 21, 2009 (obtained Nov. 19, 2014).
Communication pursuant to Article 94(3) EPC dated Dec. 12, 2017 in connection with European Patent Application No. 12824941.4, 4 pages.

* cited by examiner

SECURE USER AUTHENTICATION FOR BLUETOOTH ENABLED COMPUTER STORAGE DEVICES

CROSS-REFERENCE TO RELATED APPLICATIONS

This application claims priority to U.S. Provisional Application No. 61/581,313, filed Dec. 29, 2011, entitled USER AUTHENTICATION FOR SECURE PORTABLE STORAGE DEVICE, the entirety of which is incorporated by reference herein. This application also claims priority to U.S. Provisional Application No. 61/583,878, filed Jan. 6, 2012, entitled USER AUTHENTICATION FOR SECURE PORTABLE STORAGE DEVICE, the entirety of which is incorporated by reference herein.

FIELD OF THE INVENTION

The present disclosure relates to user authentication for a computer storage device. Particularly, the present disclosure relates to user authentication for a computer storage device utilizing a portable computing device, such as, but not limited to, a mobile phone or smartphone, a tablet PC, a personal digital assistant (PDA), a laptop computer, or the like.

BACKGROUND

Portable and removable storage devices (collectively referred to herein as "computer storage devices"), such as internal hard drives, external hard drives, flash drives, USB (universal serial bus) drives, portable disk drives, memory cards, optical media, tape devices and RDX or removable data cartridges are commonly used to provide storage and access to data, applications, etc. stored on the computer storage device via a computing system to which the user may operably connect the computer storage device. Some computer storage devices include security measures and require user authentication prior to access to the data, applications, etc., which are stored on the computer storage device.

The security measures provided on such devices include single factor authentication, as traditionally based on a password or other similar knowledge known to the user. This is often referred to as "something you know" authentication. For example, as illustrated in FIG. 1, such traditional systems 100 for authentication of computer storage devices 104 require that some authenticating information, such as a password 102, be provided in order to access the computer storage device 104 via a computing system 106.

Accordingly, such traditional systems and methods for authentication of the user for access to the data, applications, etc. stored on a computer storage device require the user to enter, for example, a password each and every time the user wants to access the data or at least each and every time the storage device is coupled to a host computing system. For typical users, this may impose extra steps to access the data, particularly if access is desired several times in a relatively short period of time. In addition, this requires the user to remember the password or authentication information, which can be burdensome.

Often, users want secure and immediate access without extra effort. Thus, there exists a need in the art for systems and methods for user authentication for a computer storage device, which overcome the above disadvantages.

BRIEF SUMMARY OF THE INVENTION

The present disclosure relates to user authentication for a computer storage device using Bluetooth communication. More particularly, the present disclosure relates to user authentication for a computer storage device using Bluetooth capabilities, without requiring Bluetooth pairing of devices. The disclosure also relates to systems and methods for authentication via Bluetooth communications, to utilize and protect unique pairing information related to the devices in a manner that allows this information to be used for strong authentication to protect information stored on computing devices having an enabled Bluetooth radio, or other Bluetooth enabled interface.

The present disclosure, in one embodiment, relates to a system for user authentication for a storage device. The system may include a storage device operably coupleable with a host computing device, with the storage device and/or host computing device being Bluetooth enabled.

The storage device may comprise authentication information for a Bluetooth enabled device, for example a Bluetooth enabled computer storage device, portable data storage device, secure storage device, secure portable storage device, "dongle," or other Bluetooth enabled device. Authentication may allow any Bluetooth enabled device to be used during the authentication process to the computer storage device. Benefits include use of Bluetooth authentication without pairing, for any computer storage device that is connected to a host computer. This would include authenticating through the host computer to a local hard drive, an external hard drive, a flash drive, an RDX cartridge, a tape cartridge, a memory stick, an SD (secure digital) card, optical media, and other Bluetooth enabled devices.

Access to the storage device may be permitted via Bluetooth communication between the Bluetooth enabled device and at least one of the storage device or host computing device, where the Bluetooth enabled device is within the Bluetooth range of the storage device. In some embodiments, the Bluetooth communication between the Bluetooth enabled device and at least one of the storage device or host computing device may be performed without Bluetooth pairing or one or all of the Bluetooth enabled devices.

The authentication information may include the Bluetooth name and address of the Bluetooth enabled device, and the Bluetooth communication between the Bluetooth enabled device and at least one of the storage device or host computing device may include transmission from the portable Bluetooth enabled device of the Bluetooth name of the Bluetooth enabled device. In other embodiments, the authentication information may comprise a unique identifier for the Bluetooth enabled device and an authentication key, and the Bluetooth communication between the Bluetooth enabled device and at least one of the storage device and the host computing device may include transmission from the portable Bluetooth enabled device of the authentication key.

The authentication key may be a fixed key, or may be automatically cycled between a plurality of authentication keys, the authentication keys being at least one of predetermined keys or non-predetermined, generated keys. In some embodiments, the storage device may be a USB flash drive and/or the portable Bluetooth enabled device may be a mobile phone or smartphone. The portable Bluetooth enabled device may, in some cases, be an authentication control application loaded on a portable Bluetooth enabled device. The maximum Bluetooth range could be a predetermined configured range or a range limited only by the Bluetooth capabilities of the Bluetooth enabled device, and at least one of the storage device and the host computing device.

The present disclosure, in another embodiment, relates to a computer storage device. The computer storage device may include a configuration utility for setting up a portable Bluetooth enabled device as an authentication factor for access to at least a portion of the memory on the storage device, authentication information for a Bluetooth enabled device set up as an authentication factor, and an access module permitting access to the at least a portion of the memory on the storage device via Bluetooth communication between the Bluetooth enabled device and at least one of the storage device or a host computing device to which the storage device is operably coupled if the Bluetooth enabled device is within a Bluetooth range of the storage device.

The Bluetooth communication between the Bluetooth enabled device and at least one of the storage device and the host computing device may be done without Bluetooth pairing. The authentication information may include the Bluetooth name and address of the Bluetooth enabled device, and the Bluetooth communication between the Bluetooth enabled device and at least one of the storage device and the host computing device may include transmission from the Bluetooth enabled device of the Bluetooth name.

In other embodiments, the authentication information may comprise a unique identifier for the Bluetooth enabled device and an authentication key, and the Bluetooth communication between the Bluetooth enabled device and at least one of the storage device or host computing device may include transmission from the Bluetooth enabled device of the authentication key. The authentication key may be a fixed key or may be automatically cycled between a plurality of authentication keys, the authentication keys being at least one of predetermined keys or non-predetermined, generated keys.

The present disclosure, in another embodiment, relates to a method for user authentication for a storage device. The method may permit access to a storage device operably coupled to a host computing device when a portable Bluetooth enabled device is brought within no more than a Bluetooth range of the storage device. The portable Bluetooth enabled device and at least one of the storage device and host computing device may be Bluetooth enabled, and the storage device may include authentication information for the portable Bluetooth enabled device.

In some embodiments, access is permitted to the storage device based on Bluetooth communication between the Bluetooth enabled device and at least one of the storage device and host computing device without Bluetooth pairing thereof. The method may further include receiving from the portable Bluetooth enabled device, and storing in memory of the storage device, the authentication information for the portable Bluetooth enabled device. In some cases, at least a portion of the authentication information may be generated by the portable Bluetooth enabled device.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature, and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

DETAILED DESCRIPTION

Figure 1:
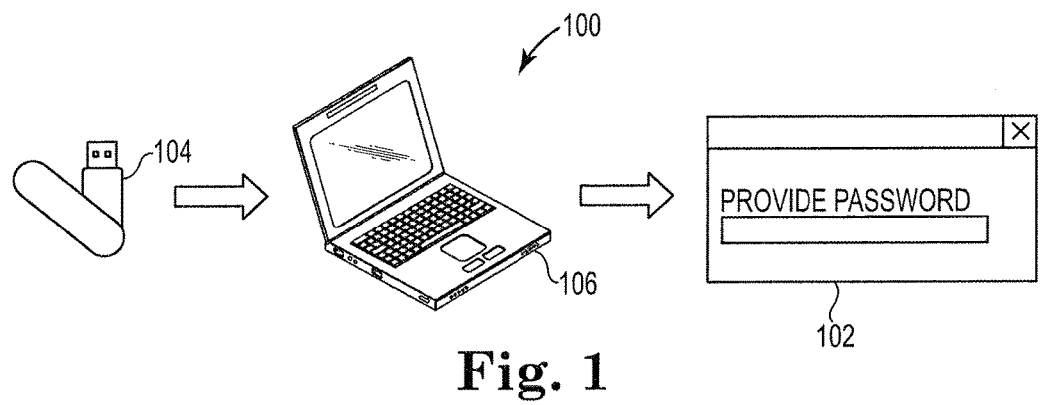
FIG. 1 is a diagram of a prior art authentication system.

The present disclosure relates to systems and methods for user authentication using Bluetooth communications to or between a computing device and its associated storage devices. Particularly, the present disclosure relates to systems and methods for user authentication of a computer storage device via a portable Bluetooth enabled device or portable computing device, such as, but not limited to, a mobile phone or smartphone, tablet PC, personal digital assistant (PDA), laptop, and the like. More particularly, the present disclosure relates to systems and methods for user authentication to a computer storage device using Bluetooth communication between a computing device that has an enabled Bluetooth radio or other Bluetooth enabled interface, and any Bluetooth enabled device. Even more particularly, the present disclosure relates to systems and methods for user authentication for a computer storage device using Bluetooth capabilities, without requiring Bluetooth pairing of devices. It should be noted that, while the present application generally refers to Bluetooth communications, other communication methods and protocols, currently existing or to be developed, could be used with the present invention. As used in the present application, the term "authentication" is meant to broadly include any process or functionality for providing authorization, access control, permission, approval, or the like.

Generally, Bluetooth technology is a short-range, wireless communications technology that is relatively simple and secure. It is now commonly available in a variety of devices, including mobile phones, computers, and other products. The Bluetooth Specification defines a uniform structure for devices to connect and communicate with each other. When two Bluetooth enabled devices connect to each other, this is referred to as "pairing." For example, Bluetooth pairing may include two Bluetooth enabled devices communicating with each other and establish a connection for Bluetooth communications. To pair the Bluetooth devices, a password or passkey may be exchanged, or a code may be shared by both Bluetooth devices, establishing that the devices (or their users) have agreed to a Bluetooth pairing between the devices. Current pairing methods used to connect two Bluetooth enabled devices provide secure authentication between the initial devices, but may not provide sufficient security to allow strong authentication for data stored on computing devices that have a Bluetooth radio or other Bluetooth enabled interface. Enhanced authentication methods are needed when providing access to protected data on a computing device and its associated data storage, when the computing device has an enabled Bluetooth radio or other Bluetooth enabled interface.

In addition, authentication using traditional Bluetooth authentication systems and methods can also include extra steps. For example, one disadvantage of traditional Bluetooth authentication systems and methods includes the need for re-pairing between Bluetooth enabled devices after the devices have been intentionally or unintentionally un-paired. Similarly, the process for pairing Bluetooth devices can include numerous user steps or other steps that a user must complete, for example agreement to the pairing, agreement on a passkey, and entering the passkey into the devices. In the context of a computer storage device, each time the computer storage device is introduced to a new host computing device, the user would be required to perform the pairing process and perform such onerous steps; this can be particularly irritating where a user desires to use the computer storage device with multiple host computing devices.

Thus, there exists a need in the art for systems and methods for user authentication for a computer storage device via a portable Bluetooth enabled device using Bluetooth capabilities. Additionally, there is a need in the art for systems and methods for user authentication for a computer storage device via a portable Bluetooth enabled device using Bluetooth capabilities, without requiring Bluetooth pairing of the devices, or without requiring one or more associated user steps.

As discussed above, security measures for computer storage devices traditionally using single factor "something you know" authentication require the user to remember authentication information needed for access (e.g., a password), and/or that the authentication information be provided generally each and every time the user wants access to the storage device. In embodiments of the present disclosure, authentication and access to the storage device may be based on something the user has, is carrying, or is otherwise in relatively close proximity when the user attempts to access the storage device. This can be referred to as "something you have" authentication.

Figure 2:
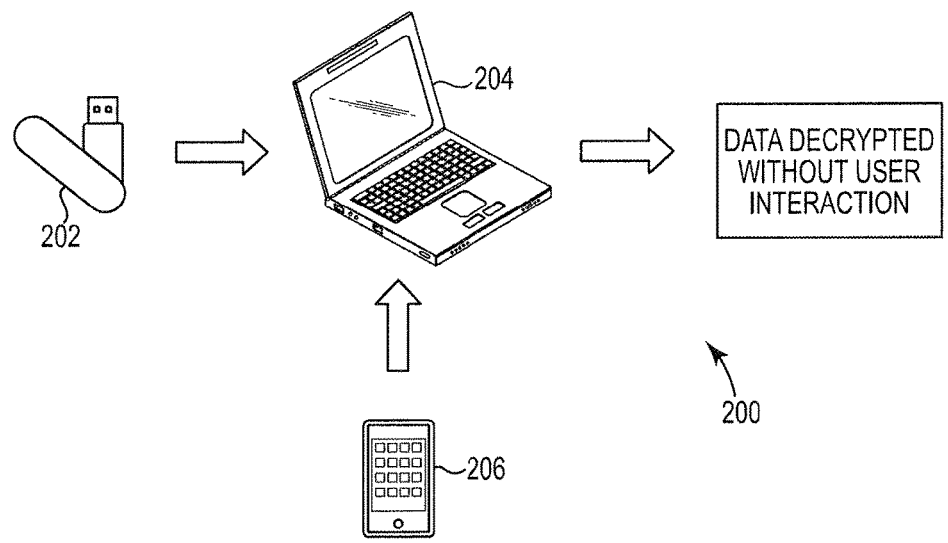
FIG. 2 is a diagram of an authentication system in accordance with an embodiment of the present disclosure.

FIG. 2 generally illustrates a system 200 for authentication of a user for access to data, applications, etc. stored on a computer storage device 202 in accordance with an embodiment of the present disclosure. Portable, removable or fixed storage media or device 202 may be operably connected with a host computing device 204, through which access to the storage device may be provided. The computer storage device 202 may provide portable or fixed storage of any suitable or desired data or applications, for example, to which the user may store for use at and/or transport between one or more host computing devices. Computer storage device 202 can include any storage media or device that is designed to be fixedly attached or relatively easily disconnected or removed from a host computing device, and in many cases, without powering down the computing device, and may include but is not limited to: internal and external hard disk drives, USB flash drives, memory cards, tape cartridges, and optical media including optical disks (e.g., Blu-ray disks, digital versatile disks or DVDs, and compact disks or CDs). Additional suitable computer storage devices include data protection appliances, archival storage devices, and cloud-based data storage devices, including, but not limited to, Imation DataGuard, Imation One, and Imation PRO devices, as available from Imation Corporation of Oakdale, Minn. For cloud storage devices, the Bluetooth device may be accessed utilizing a plug-in (or "plugin") application or extension software installed in a browser application, either on the host computer or on another system coupled to the host computer via a network, or over the world wide web.

Host computing device 204 may be any suitable computing device to which a removable storage media or device may be coupled and accessed, such as but not limited to: a personal computer, including compact or portable computers and laptops, servers, tablet computers, smartphones, etc. Host computing device 204 may further include Bluetooth technology, or otherwise be Bluetooth enabled. However, if the host computing device 204 is not itself Bluetooth enabled, a Bluetooth enabled device, such as but not limited to, a USB Bluetooth transceiver, can be operably and/or removably coupled with the host computing device, thereby providing Bluetooth capabilities to the host computing device.

In the system for authentication 200, authentication of the user prior to access to the data, applications, etc. stored on computer storage device 202 may be desired or required. As discussed above, however, alternatively or additionally (as will be discussed in further detail below) to single factor "something you know" authentication, which requires the input of authentication information from the user, authentication in system 200 may be permitted via "something you have" authentication based on something the user has, is carrying, or is otherwise in relatively close proximity to when the user attempts to access the storage device, for example to provide automatic authentication without user interaction or user-performed authorization steps.

The device that the user has, is carrying, or is otherwise in relatively close proximity to when the user attempts to access the storage device may be referred to herein as a "Bluetooth enabled device" 206. The Bluetooth enabled device 206 may communicate with the host computing device 204 to provide authentication for the user to the computer storage device 202. In an embodiment of the present disclosure, the Bluetooth enabled device 206 may communicate with the host computing device 204 automatically, such that no additional action is required by the user other than bringing the Bluetooth enabled device in relatively close proximity to the host computing device. The Bluetooth enabled device 206 may be any suitable device capable of communication with the host computing device 204, and may include, but is not limited to, a mobile phone or smartphone, a personal digital assistant (PDA), a tablet computer, a smartcard, or a specially-designed or custom Bluetooth enabled device, etc., or a secondary or discrete Bluetooth "dongle." However, many people now commonly have and carry a mobile phone or smartphone with them. Thus, in one particular embodiment, a mobile phone or smartphone may be used as the Bluetooth enabled device 206, as it permits including a "something you have" factor or device without requiring the typical user to carry any additional hardware.

In an embodiment, the Bluetooth enabled device 206 may communicate with the host computing device 204 to provide user authentication for access to the computer storage device, and in some cases automatically, via one or more Bluetooth communication protocols. Mobile phones, smartphones, tablets, tablet computers, keyboards, computer mouse devices and other computing, communications, data storage or peripheral devices may be desirable in some embodiments, as they are often Bluetooth enabled (i.e., include hardware and/or software for communicating using Bluetooth technology). The communication range of the Bluetooth device(s) can also be advantageous, because it generally involves the user being in a working range of the host computing device 204.

In some embodiments, the computer storage device 202 may store and/or maintain information relating to the Bluetooth enabled device 206 in order to permit subsequent authentication of the Bluetooth enabled device. Such information relating to the Bluetooth enabled device may be received through a setup process of the Bluetooth enabled device. In some embodiments, the computer storage device 202 may include software for performing a setup process for the Bluetooth enabled device and/or any subsequent Bluetooth enabled device authentication processes, each of which may be run via the host computing device 204. In other embodiments, the host computing device 204 may include or be configured with appropriate software, which in some but not all cases may be received from or installed by the computer storage devices, for performing a setup process for the Bluetooth enabled device and/or any subsequent Bluetooth enabled device authentication processes. However, as the computer storage device 202 may be used at any number of suitable host computing devices or stations 204, it may be desirable to include a software application used to set up authorization between a Bluetooth enabled device and a computing device and its associated computer storage devices, or software for performing a setup process for Bluetooth enabled devices and/or any subsequent Bluetooth enabled device authentication processes on the computer storage device (e.g., for a previously identified, authorized, or authenticated Bluetooth enabled device, based on the unique Bluetooth identification value, name, or identifier thereof). Such applications may be installed on the Bluetooth enabled device, on the computing device, or on the associated computer storage device, or on any combination thereof.

In further embodiments, the computer storage device 202 may include additional hardware and/or software permitting a user of the computer storage device to identify or select other characteristics of the authentication process, such as, but not limited to, the strength and/or type of authentication desired. For example, the received signal strength of the Bluetooth enabled device 206 could be configured to limit access. In one embodiment, during setup or some subsequent administration event, the user could provide or select a distance relating to how close the Bluetooth enabled device may generally need to be for authentication, which may be any suitable distance from, for example, a few feet or less (or one meter or less) up to the maximum distance permitted by the Bluetooth technology (for example, up to one meter, up to ten meters, or up to 100 meters for long-range devices). Shortened selected or predetermined maximum Bluetooth ranges or distances (for example, less than one meter, less then two meters, or less than five meters) can, for example, be determined to reduce or prevent nearby persons from trying to access the computer storage device.

In further embodiments, where a user desires stronger authentication, two-factor authentication, where both the "something you have" and "something you know" authentication factors are required, may be utilized. That is, in one embodiment, in order for a user to be authenticated and granted access to the computer storage device 202, the user may be required to both have the Bluetooth enabled device 206, and to provide known authentication information, such as a password, or the answer to a hint or challenge question. In some cases, the "something you know" authentication information may be provided at the host computing device 204, while in other cases, the "something you know" authentication information may be provided at the Bluetooth enabled device 206 or via any other suitable means, such as a keypad operably coupled with the host computing device.

However, in other embodiments, either a "something you know" factor or "something you have" factor, with a combination of one or both being unnecessary, may be provided as user authentication in a single factor authentication system. For example, during any given access attempt to the computer storage device 202, the user may provide authentication via a Bluetooth enabled device 206, which in some cases may be automatic; that is without further user input, besides bringing the Bluetooth enabled device into proximity to the host computer or computer storage device. However, where the user does not have a Bluetooth enabled device or the Bluetooth enabled device is not currently with the user, such as where the user did not bring the Bluetooth enabled device, the user lost the Bluetooth enabled device, or the Bluetooth enabled device was inoperable or stolen, for example, the user may provide authentication via a password or other "something you know" factor. Likewise, for example, where the computer storage device 202 is operably connected to a host computing device 204 that is not Bluetooth enabled, the user may provide authentication via a password or other "something you know" factor. As such, in some embodiments, "something you know" authentication may be provided as a backup for "something you have" authentication. However, in other embodiments, the disclosure allows for automatic, single factor Bluetooth authentication from a Bluetooth enabled device to the host computing device and associated computer storage device. Single factor Bluetooth authentication allows the user to authenticate to the host computing device and associated computer storage device automatically, without requiring the user to enter a separate password.

In some embodiments, the system 200 may desirably include additional measures to protect against unauthorized access, for example, in case both the Bluetooth enabled device 206 and computer storage device 202 are stolen, since in such a case, the data or applications stored on the computer storage device could be accessed with single factor "something you have" authentication. For example, the Bluetooth enabled device 206 may include a timeout period, in which the Bluetooth enabled device will no longer provide authentication information without further interaction from the user to reset the timeout period. For further example, a timeout period may be set for a certain number of days, such that after the specified number of days, the Bluetooth enabled device will no longer transmit the authentication information until the user interacts with the Bluetooth enabled device, such as but not limited to, by providing a password or other known information. Of course, the timeout period could be adjustable and may be set to any suitable duration of time, for example but not limited to, from any number of seconds to any number of days, and could even be set to never expire, if so desirable. Accordingly, a Bluetooth enabled device with such additional security measures could provide additional security where a Bluetooth enabled device is lost or stolen. In another example, a form of three factor authentication could be implemented. In this case, a software application running on the host computing device to which the storage device is attached would collect unique system configuration information about the host computing device to create a unique seed value used to create and protect the encryption key that is used in the authentication process between the Bluetooth enabled device and the computer storage device associated with or attached to the host computer. The encryption key consisting of the unique seed value derived from the host computing device, the hashed value of the user's Bluetooth enabled device unique device ID, and/or the user's password and/or hint question/answer. The benefit of this approach is that it prevents unauthorized access by requiring all three elements to be stolen, the host computing device, the Bluetooth enabled device, and the computer storage device. And an attempt to break the encryption key would require knowledge of the explicit seed value derived from the host computing system, the unique Bluetooth device record used in establishing authentication via Bluetooth enabled devices, and the user's password and/or hint question/answer.

As will be understood by the disclosure provided herein, in some embodiments, more than one Bluetooth enabled device could be associated with a single computer storage device or more than one computer storage device could be associated with a single Bluetooth enabled device. Furthermore, while often discussed herein as utilizing Bluetooth capabilities of the host computing device, it is recognized that in other embodiments, the computer storage device itself may include the Bluetooth capabilities, such as by including a Bluetooth module or device as part of the computer storage device. In such embodiments, the Bluetooth module on the computer storage device could itself be used to make the Bluetooth connection with the Bluetooth enabled device, rather than utilizing a Bluetooth connection via the host computing device. However, such embodiments may increase costs for the computer storage device.

In one embodiment of the present disclosure, Bluetooth pairing between the host computing device 204 and the Bluetooth enabled device 206 may be utilized to provide authentication information for access to the computer storage device 202 operably connected to the host computing device. As indicated above, the computer storage device 202 may include any software for performing a setup process of the Bluetooth enabled device and/or any subsequent Bluetooth enabled device authentication processes. Accordingly, an initial setup process may be utilized to identify the Bluetooth enabled device 206 while the Bluetooth enabled device is in a discoverable mode and associate the Bluetooth enabled device with the computer storage device 202, such that the Bluetooth enabled device 206 may be utilized as a "something you have" authentication factor. For example, the software provided on the computer storage device 202 could utilize one or more application programming interfaces (APIs) to access the Bluetooth capabilities of the host computing device 204 and obtain a list of nearby Bluetooth enabled devices in discoverable mode, from which the Bluetooth enabled device may be identified. As indicated above, the computer storage device 202 may store and/or maintain information relating to the Bluetooth enabled device 206 in order to permit subsequent authentication of the (e.g., previously identified, authenticated or authorized) Bluetooth enabled device. In some embodiments, the information relating to the Bluetooth enabled device 206 may consist of or comprise a unique identification (UID) of the Bluetooth enabled device, such, as but not limited to, a unique identification name or number.

In embodiments of the present disclosure, a function, application, or program may be installed on the Bluetooth enabled device 206 for checking for and identifying a Bluetooth request. In some embodiments, the application may be run substantially continuously or may be switched on/off by the user, such that the user can control when the application is running. In further embodiments, the application can be configured for running in the background of other operations.

The host computing device 204 may perform functions relating to Bluetooth discovery, which again may be controlled by one or more applications or programs installed on the computer storage device 202 or the host computing device. The discovery operations for a Bluetooth pairing may desirably be performed by the host computing device 204, in some embodiments, because it can be a battery-intensive action and because if performed by the Bluetooth enabled device 206, may drain the Bluetooth enabled device battery relatively quickly, or otherwise be relatively battery-inefficient. Nonetheless, in other embodiments, functions relating to Bluetooth discovery could be performed by the Bluetooth enabled device 206 while functions relating to checking for and identifying a Bluetooth request may be performed by the host computing device 204. While Bluetooth pairing could be performed through secure simple pairing (SSP) or a passkey/PIN (personal identification number) entry, because PIN entry may be an unsecure or less secure method, in some embodiments, Bluetooth pairing using SSP may be desirable.

In use, when the host computing device 204 discovers that the Bluetooth enabled device 206 has come into range, a Bluetooth pairing between the host computing device and the Bluetooth enabled device may be completed, and communication between the devices may take place. As discussed above, such pairing may be completed automatically. Once connected, the host computing device 204 or computer storage device 202 via the host computing device may request, or the Bluetooth enabled device 206 may send, such as through the application installed and running on the Bluetooth enabled device, authentication information relating to the Bluetooth enabled device permitting authentication of the Bluetooth enabled device. In some embodiments, the authentication information may consist of or comprise a UID of the Bluetooth enabled device, or other suitable identification of the Bluetooth enabled device known to the computer storage device 202. In such cases, the authentication information (e.g., UID) may provide the "something you have" factor for authentication.

While some initial setup of the computer storage device 202, host computing device, and/or Bluetooth enabled device 206 may be required, subsequent authentication of a user attempting to access the computer storage device may be configured so as to require no further action by the user. For many users, this could be a desired form of authentication because it does not require further action from the user for authentication. However, as discussed above, "something you know" authentication, such as authentication via a password, may be used in addition to the "something you have" authentication described herein, and could provide additional security. Additionally, in some embodiments, "something you know" authentication may be provided as a backup for the "something you have" authentication described herein, for example, in cases where the user does not have a Bluetooth enabled device or the Bluetooth enabled device is not currently with the user, such as where the user did not bring the Bluetooth enabled device, the user lost the Bluetooth enabled device, or the Bluetooth enabled device was inoperable or stolen.

Embodiments disclosed above provide user authentication to a computer storage device by means of a "something you have" factor by way of Bluetooth pairing. While such embodiments provide many advantages over traditional "something you know" authentication, as discussed above, one disadvantage of Bluetooth pairing is that the process for pairing Bluetooth devices can include numerous or onerous steps that a user must complete for each host device, which can be particularly irritating where a user desires to use the computer storage device with multiple host computing devices.

Accordingly, in some embodiments of the present disclosure, certain Bluetooth technology characteristics or capabilities may be utilized to provide authentication information for access to the computer storage device operably connected to the host computing device without requiring a Bluetooth pairing between the host computing device and the Bluetooth enabled device. More generally, in some embodiments, certain Bluetooth technology characteristics or capabilities may be utilized to provide user authentication to the computer storage device utilizing Bluetooth enabled devices to provide a "something you have" authentication factor, without establishing a paired communication connection between the Bluetooth enabled devices. Instead, the Bluetooth enabled device may generally operate to access and provide information suitable for use in authenticating the Bluetooth enabled device, such as but not limited to, a device address, a device name, Imp version, Imp subversion, manufacturer, features, etc., through certain Bluetooth communication protocol features, without requiring a pairing, or full pairing, of the Bluetooth enabled device and host computing device (or, as mentioned above, a Bluetooth module of the computer storage device). When such unique authentication values are collected and used from the Bluetooth enabled device, such as device address, device name, Imp version, etc., through the Bluetooth communication protocol, this information may be used to construct a unique authentication encryption key that provides access to data stored on the computer storage device only when that specific Bluetooth enabled device is understood through the communication protocol, to be in proximity to the host computing device and the associated computer storage device. A benefit is that each Bluetooth enabled device can be identified uniquely using the communication protocol to understand unique Bluetooth enabled device information as described above. Another benefit is that when the Bluetooth enabled device is detected to be in range of the host computing device and associated computer storage device, this information can be automatically communicated from the Bluetooth enabled device to the software application running either on the host computing device or on the associated computer storage device during the authentication process. This information can be deconstructed automatically by the software application to ensure that the corresponding unique "key" matches the Bluetooth enabled device that was authorized in the setup process, and subsequently access to the protected data on the computer storage device is provided automatically.

Setup and subsequent authentication for these embodiments of the present disclosure are described with respect to FIGS. 3A-5B. As an initial setup process, as illustrated particularly in FIGS. 3A and 5A, a user may set up the "something you have" authentication relationship between a computer storage device 302 and some other device that the user has, is carrying, or is otherwise in relatively close proximity to when the user attempts to access the storage device, which has been referred to herein as a "Bluetooth enabled device" 306. The Bluetooth enabled device includes Bluetooth technology and is, thereby, Bluetooth enabled. The computer storage device 302 may be operably or removably connected with a host computing device 304. As discussed above, at least one of the computer storage device 302 or the host computing device 304 is Bluetooth enabled.

Figure 5A:
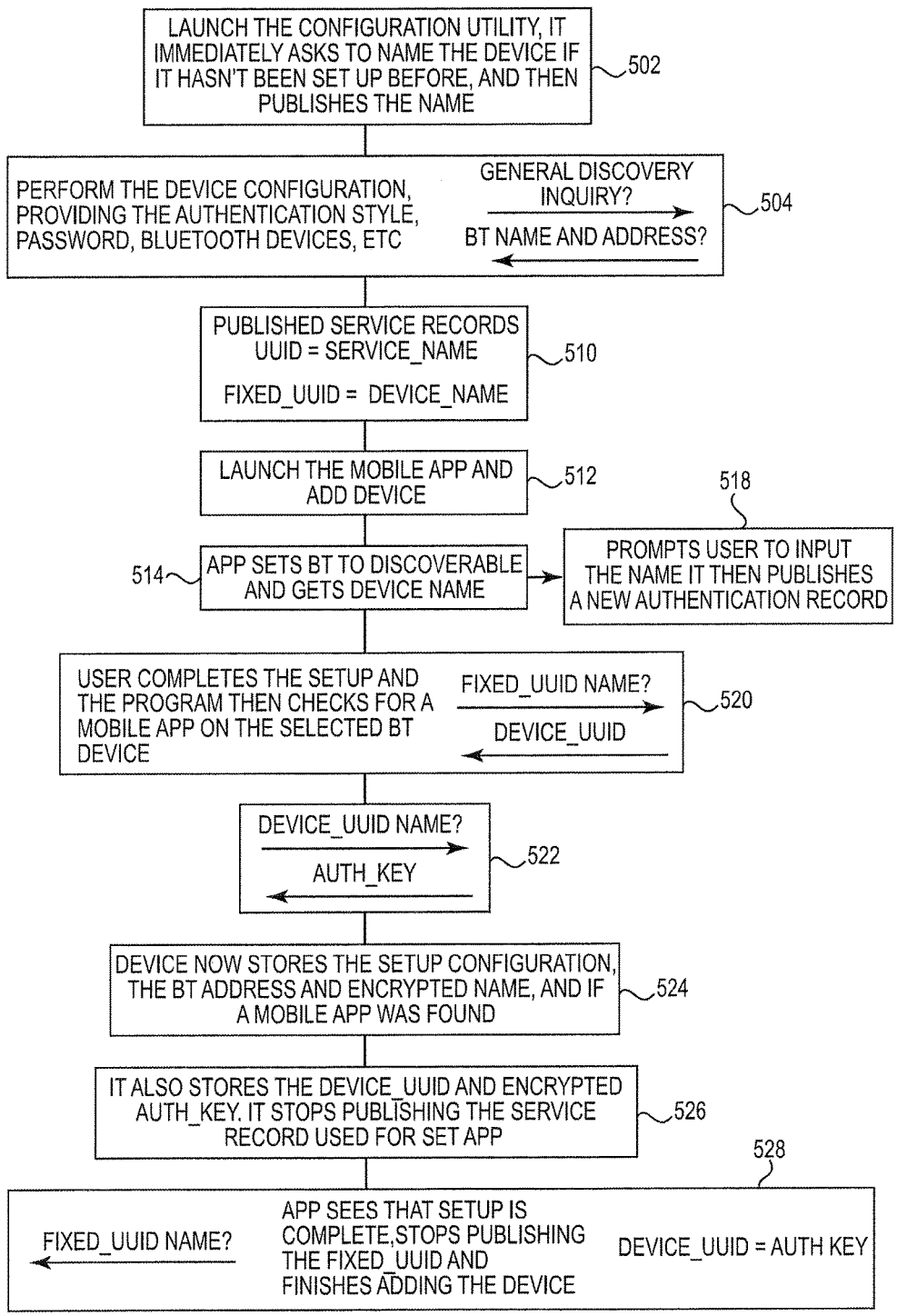
FIG. 5A is a process flow diagram for setting up authentication systems in accordance with embodiments of the present disclosure.
Figure 5B:
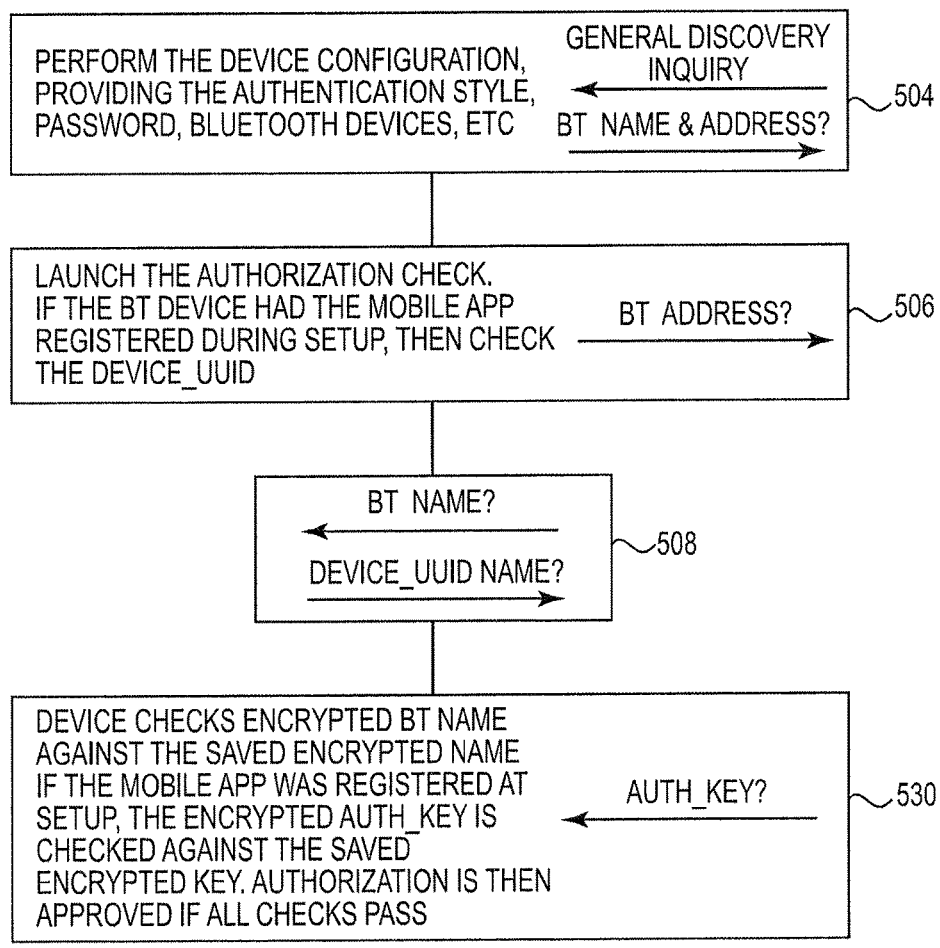
FIG. 5B is a process flow diagram for user authentication for systems in accordance with embodiments of the present disclosure.

As illustrated in step 502 in FIG. 5A, once the computer storage device 302 is operably connected with the host computing device 304, a configuration utility may be launched for setting up the authentication relationship between the computer storage device and the Bluetooth enabled device 306. As discussed above, the computer storage device 302 may include any software for performing such setup process of the Bluetooth enabled device; however, it is also recognized that the host computing device 304 may alternatively or additionally be configured with all or part of the software utilized for the setup process. If the computer storage device 302 has not yet been used, the configuration utility may provide an initial setup for the computer storage device, which in one embodiment, may at least comprise providing an identifier for the computer storage device, such as, but not limited to, a name for the storage device.

In some embodiments, the user may also set up a password for "something you know" authentication, which as discussed above may be used in addition to or alternatively to "something you have" authentication, for example, but not limited to, as a back-up authentication factor. In some but not all cases, the password may be required for setting up the authentication relationship between the computer storage device and the Bluetooth enabled device 306, or for other administration activities. In other embodiments, once an authentication relationship between the computer storage device 302 and the Bluetooth enabled device 306 has been set up, the Bluetooth enabled device may be used as authentication for access to administrative tools.

After initial setup of the computer storage device 302, the configuration utility may cause the Bluetooth module or device of the host computing device 304 to perform Bluetooth discovery functions to identify nearby Bluetooth enabled devices, as illustrated in step 504. If the Bluetooth enabled device 306 is operating in a discoverable mode, such that its Bluetooth name and address are published for discovery, and is within Bluetooth range, or other specified range, the Bluetooth enabled device may be identified.

The user may select, from any number of Bluetooth enabled devices identified during discovery, the Bluetooth enabled device 306 that the user desires to associate as a "something you have" factor with the computer storage device 302. Upon selection or other user identification of the Bluetooth enabled device 306, the computer storage device 302 may store the Bluetooth name and address of the Bluetooth enabled device 306, along with any other desirable and available identifying information. In some embodiments, any of the stored information for the Bluetooth enabled device 306 may be hashed prior to storage. This may complete initial setup of the authentication relationship between the computer storage device and the Bluetooth enabled device 306. However, it is recognized that any additional steps may be included as desired for the setup process, including steps for setup of any other characteristics of the computer storage device 302 or setup of any characteristics of subsequent authentication processes, such as, but not limited to, the strength and/or type of authentication desired, as described above. The setup process, or portions thereof, may be repeated for setting up and associating any number of desired Bluetooth enabled devices 306 with the computer storage device 302. Similarly, the setup process, or portions thereof, may be repeated for setting up and associating any number of computer storage devices 302 with a single Bluetooth enabled device 306.

The authentication relationship between the Bluetooth enabled device and the host computer and associated computer storage device is established through the creation of a unique authentication key that is created by the software application, running on the host computing device or the computer storage device itself, or a combination thereof. The software application through an application programming interface or API makes a call to the Bluetooth communication protocol to obtain unique Bluetooth device information, as described above, and uses this information as the first step to create a unique key, used to protect the underlying encryption key that provides access to protected and encrypted information on the computer storage device. The unique Bluetooth enabled device information may be hashed using a mathematical hash algorithm. If the user chooses dual factor authentication which requires the knowledge of an underlying password, then the password input, as well as the user's password hint question/answer pair is hashed also. These hashes are constructed together to create the unique protection key used that protects the computer storage device encryption/decryption key. Whenever a user wants to access their computer storage device through the host computer, the unique protection key can be automatically derived by the software application running on the host computer, by determining if the Bluetooth enabled device that has been set up for automatic authorization is present, or the user has provided the appropriate input for the password and or hint question/answer pair if dual factor authentication has been set up. In a three factor model, the final value is the unique host computing device seed value, which could consist of the device ID, volume serial number, unique registry setting values, or other specific values of the personal computer (PC) or other computing device, that is also uniquely hashed to create a third part of the key protection key used to protect the underlying data encryption key that provides access to protected or encrypted data on the computer storage device. The software application running from the host computing device will determine if three factor authentication has been enabled by the user and will automatically check for the presence of all three required seed values, the Bluetooth enabled device unique device values, the host computing device unique device values, and the user password and/or hint/question answer before it grants a user access to the protected data on the computer storage device.

Figure 3A:
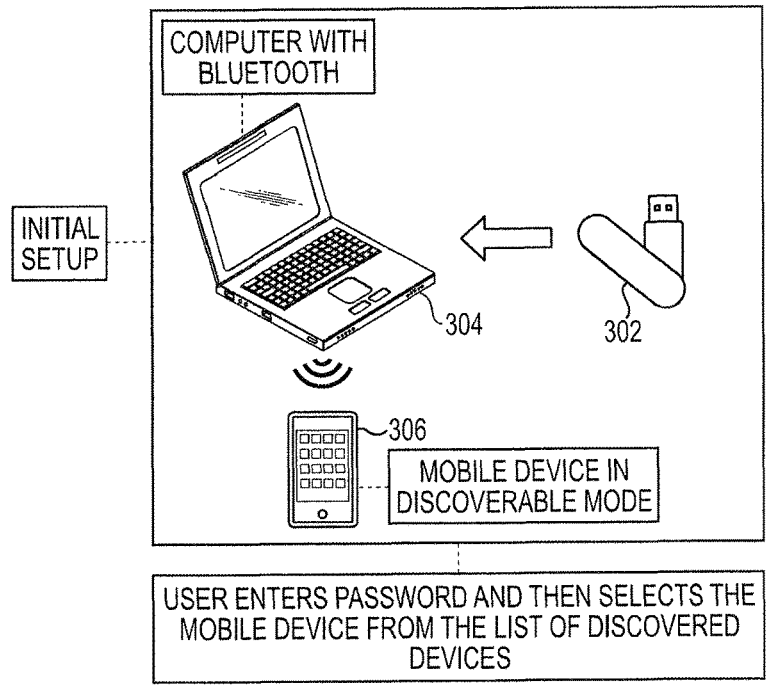
FIG. 3A is a diagram of a setup procedure for an authentication system in accordance with an embodiment of the present disclosure.
Figure 3B:
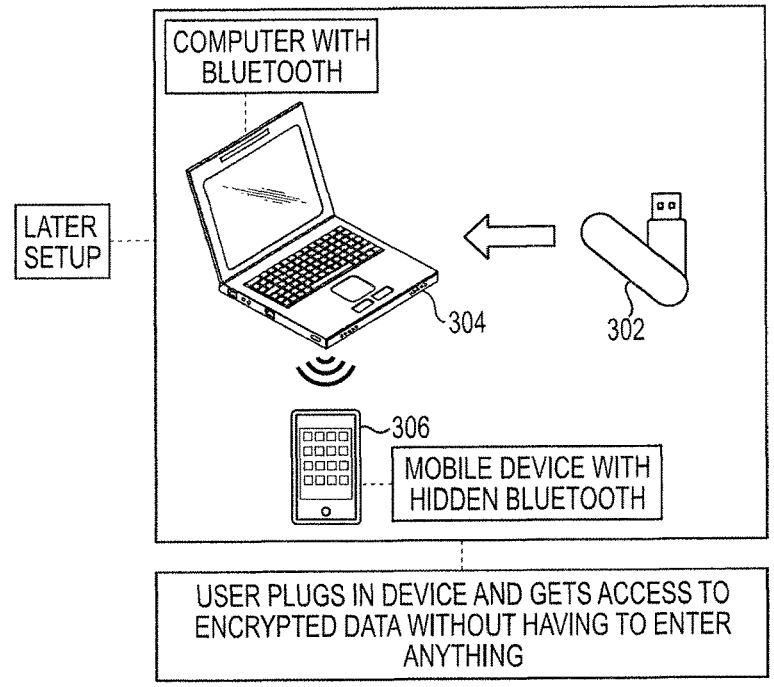
FIG. 3B is a diagram of an authentication procedure for an authentication system in accordance with an embodiment of the present disclosure.

As illustrated in FIG. 3B, to later use the Bluetooth enabled device 306 as the authentication factor for accessing the computer storage device 302, the user may initially operably couple the computer storage device 302 to a host computing device 304, which may or may not be the same host computing device as used for setup. As discussed above, the computer storage device 302 may include any software for performing authentication procedures; however, it is also recognized that the host computing device 304 may alternatively or additionally be configured with all or part of the software utilized for the authentication procedures. If the host computing device 304 has a Bluetooth device (or if the computer storage device itself includes a Bluetooth device), the software may search the computer storage device 302 for any stored Bluetooth addresses of Bluetooth enabled devices that can be used for "something you have" authentication. As illustrated in step 506 of FIG. 5B, the software may cause the Bluetooth module or device of the host computing device 304 to send a Bluetooth request for the Bluetooth name associated with a Bluetooth address stored in the computer storage device. A Bluetooth request may be sent for each of the Bluetooth enabled devices, or a subset of the Bluetooth enabled devices, associated with the computer storage device.

If a Bluetooth enabled device 306 with the Bluetooth address identified in the Bluetooth request sent from the host computing device 304 is in Bluetooth range, or other specified range, of the host computing device 304 and running a Bluetooth function, application, or program for checking for and identifying a Bluetooth request, such as from the host computing device 304, then such Bluetooth enabled device 306 may respond to the Bluetooth request with its Bluetooth name, as illustrated in step 508. As discussed previously, in some embodiments, the application may be run substantially continuously or may be switched on/off by the user, such that the user can control when the application is running. In further embodiments, the application can be configured for running in the background of other operations. The Bluetooth enabled device 306, however, may be operating in a non-discoverable mode, such that the Bluetooth enabled device is not generally identifiable to other Bluetooth enabled devices performing discovery functions. Yet, the Bluetooth enabled device 306 is still able to receive and respond to Bluetooth requests while non-discoverable. Such mode can be desirable where the user does not want the Bluetooth enabled device 306 to be identifiable by other Bluetooth systems while providing authentication information. If the Bluetooth name received from the Bluetooth enabled device 306 matches the Bluetooth name stored on the computer storage device 302 and is associated with the Bluetooth address of the Bluetooth request, access to the computer storage device may be granted to the user, for example by the software application detecting the presence of these unique values, allowing for the unmasking of the protection key that is derived from these unique values, so as to expose the underlying data encryption key that protects data on the computer storage device, with the result being that the user is granted automatic access to the data on the computer storage device. The entire authentication process may be automatic and require no user interaction, aside from presenting the Bluetooth enabled device in sufficient proximity. However, in other embodiments, the user may be required to interact or provide manual instruction for any portion of the process. If no Bluetooth name received from a Bluetooth enabled device matches up with a Bluetooth name associated with the Bluetooth address of that Bluetooth enabled device stored on the computer storage device, then generally no authentication via "something you have" factors will be granted. However, as discussed above, in some embodiments, "something you know" authentication, such as via password authentication, may be utilized as a back-up authentication.

In an alternative embodiment, where a user may be less concerned with the Bluetooth enabled device operating in a discoverable mode, rather than searching the computer storage device 302 for hashed and stored Bluetooth addresses of Bluetooth enabled devices that can be used for "something you have" authentication, the software of the computer storage device may cause the Bluetooth module or device of the host computing device 304 to perform Bluetooth discovery functions to identify nearby Bluetooth enabled devices in discoverable mode. The software of the computer storage device 302, which may be running via the host computing device 304, may determine the Bluetooth name and Bluetooth address associated with each Bluetooth enabled device identified during discovery and determine if any Bluetooth name and address pair match any Bluetooth name and address stored on the computer storage device, such as during the Bluetooth enabled device setup process described above. If a match is found, access to the computer storage device 302 may be granted to the user. Again, the entire authentication process may be automatic and require no user interaction. However, in other embodiments, the user may be required to interact or provide manual instruction for any portion of the process.

In still another embodiment, the Bluetooth name of the Bluetooth enabled device could be utilized to contain and transmit specific information, and the two communicating devices (e.g., the host computing device 304 and the Bluetooth enabled device 306) could modify their names such that information could be sent back and forth without Bluetooth pairing. However, this could be very inefficient, as Bluetooth names are not refreshed automatically, and the software stack must request a refresh, which can take several seconds to complete. Nonetheless, such method could be utilized and is considered within the spirit and scope of the present disclosure.

Additional embodiments, however, may include further measures to more securely establish user authentication using Bluetooth capabilities without Bluetooth pairing between the Bluetooth enabled devices. Such embodiments generally relate to utilizing a Bluetooth enabled device, such as a smartphone, running a particularly configured application providing another piece of information needed for authenticating the Bluetooth enabled device as a "something you have" factor. The user could download the application to the Bluetooth enabled device, and then perform a setup or synching procedure to set up the authentication relationship between the computer storage device and the Bluetooth enabled device. Such additional piece of information or authentication criteria may provide another layer of security to the above described embodiments.

Generally, the additional piece of information that may be used can include a service record on the Bluetooth enabled device. Each Bluetooth enabled device has services registered on it that define what the device is capable of. Among others, these services include a universally unique identification (UUID), a name, and often other attributes so that two Bluetooth enabled devices know how to work together and communicate. As certain UUIDs are reserved for specific protocols, various embodiments disclosed herein may generally create their own unique UUID on the Bluetooth enabled device. The application downloaded to the Bluetooth enabled device could create a service utilizing that specific UUID, and possibly other specific information. The software running on the host PC or computing device and/or the associated computer storage device could then query service record information of that specific UUID and ensure, for example, that the service name and/or other attributes match what is expected, for example matching the encrypted and hashed values stored and used to protect the encryption key for the computer storage device. It is recognized that besides using the service name of the UUID, there are a number of attributes available on a service record that could be alternatively or additionally utilized, with the service name being just one example. Many other attributes could be defined with attribute fields for containing specified types of data for use in authentication. However, with some current smartphone devices, for example, only the service name is permitted to be modified. As such, while the present disclosure is not so limited, the present disclosure describes the various embodiments with reference to the service name.

Setup and subsequent authentication for these embodiments of the present disclosure are described with respect to FIGS. 4A-5B. Like the embodiments described above, as an initial setup process, as illustrated particularly in FIGS. 4A and 5A, a user may set up the "something you have" authentication relationship between a computer storage device 402 and some other device that the user has, is carrying, or is otherwise in relatively close proximity to when the user attempts to access the storage device, which has been referred to herein as a "Bluetooth enabled device" 406. The Bluetooth enabled device includes Bluetooth technology and is, therefore, Bluetooth enabled. The computer storage device 402 may be operably or removably connected with a host computing device 404. As discussed above, at least one of the computer storage device 402 or the host computing device 404 is Bluetooth enabled.

Again, as illustrated in step 502 in FIG. 5A, once the computer storage device 402 is operably connected with the host computing device 404, a configuration utility may be launched for setting up the authentication relationship between the computer storage device and the Bluetooth enabled device 406. As discussed above, the computer storage device 402 may include any software for performing such setup process of the Bluetooth enabled device; however, it is also recognized that the host computing device 404 may alternatively or additionally be configured with all or part of the software utilized for the setup process. If the computer storage device 402 has not yet been used, the configuration utility may provide an initial setup for the computer storage device, which in one embodiment, may at least comprise providing an identifier for the computer storage device, such as but not limited to, a name for the storage device. As illustrated in FIG. 5A, at 510, the identifier may be associated with the UID or universally unique identifier (UUID) for the computer storage device 402, which in the particular example shown in FIG. 5A, may be referred to as the "Fixed_UUID." The Fixed_UUID may be a constant UUID across all computer storage devices suitable for the various embodiments of the present disclosure, and may be requested in order to obtain, for example, the device name for the computer storage device.

Additionally, in some embodiments, the user may also set up a password for "something you know" authentication. In some embodiments, the user may set up a password for "something you know" authentication, which as discussed above may be used in addition to or alternatively to "something you have" authentication, for example, but not limited to, as a back-up authentication factor. In some but not all cases, the password may be required for setting up the authentication relationship between the computer storage device and the Bluetooth enabled device 406 for the purposes of creating a unique protection key that protects the encryption key for a protected computer storage device, or for other administration activities. In some embodiments, the protection key must be "unlocked" by the user providing the password, thus allowing access to the encryption key that provides access to encrypted data on the computer storage device. In other embodiments, once an authentication relationship between the computer storage device 402 and the Bluetooth enabled device 406 has been set up, the Bluetooth enabled device may be used as authentication for access to administrative tools.

Additionally, in some embodiments, the computer storage device has protected data stored on it that has been encrypted. The data encryption key for this data can be generated using a random number generator from an application running on/from the host computing device or the computer storage device. To protect this key and further enable strong and automatic authentication features, the data encryption key is protected using any of the unique values previously discussed, including any record values available from the Bluetooth enabled device, the user's password or hint question/answer pair, and any unique seed values derived from the host computing device. Depending on the authentication option chosen by the user, for example single factor, automatic authorization using Bluetooth, dual factor authorization using Bluetooth and a password, or three factor authorization, using Bluetooth, a password and recognition of the host computer unique seed values, the application, running from the host computing device or the storage device, hashes these values using a strong hash algorithm, and constructs a protection key that is used to protect the data encryption key of the computer storage device. A benefit of this approach is that it provides for strong authentication to the computer storage device by leveraging the unique properties used to construct a unique key using the hashed seed values to protect the encryption key. An aspect of this approach is that the application can detect and match on only one, any two, or any three of these keys automatically, to allow unlocking the protection key, thus exposing the data encryption key to the application, which in turn can grant automatic and transparent access to the encrypted data on the storage device for the purposes of writing new encrypted data to the computer storage device, or reading and decrypting encrypted data from the computer storage device.

Sometime prior to initial setup, the above-mentioned particularly configured application, which may also be referred to herein as the Bluetooth enabled device authentication control application, may be downloaded, for example by the user, to the Bluetooth enabled device. While any type of Bluetooth enabled device disclosed herein may be suitable for the various embodiments described herein, in particular embodiments, the Bluetooth enabled device may desirably be a smartphone, mobile phone, or personal digital assistant.

After initial setup of the computer storage device 402, the configuration utility may cause the Bluetooth module or device of the host computing device 404 to perform Bluetooth discovery functions to identify and accept Bluetooth requests, such as from a nearby Bluetooth enabled device. The Bluetooth enabled device authentication control application may be launched, or if already launched, may perform further setup of the Bluetooth relationship, as illustrated in step 512. As part of the further setup, an option for adding a paired computer storage device may be selected, either manually or automatically. The Bluetooth enabled device authentication control application, in step 514, may set the Bluetooth module of the Bluetooth enabled device 406 to discoverable mode and request the Fixed_UUID from the computer storage device 402, for example, via the host computing device, to obtain the associated device name of the computer storage device. As stated above, the Fixed_UUID may be a constant UUID across all computer storage devices suitable for the various embodiments of the present disclosure, and thus may be known to the Bluetooth enabled device authentication control application for setup purposes. In other embodiments, the user may simply provide the device name, such as by known input methods, to the Bluetooth enabled device authentication control application.

The Bluetooth enabled device authentication control application may then create a service record by associating a device UUID for the Bluetooth enabled device (referred to as "Device_UUID" in FIG. 5A) with the known Fixed_UUID in step 516. The device UUID may be a UUID for the Bluetooth enabled device and may be generated by any suitable means, such as but not limited to random generation or generation according to some other function. Also in step 516, the Bluetooth enabled device authentication control may separately create an authorization key or unique protection key to protect the encryption key for a protected computer storage device, and may associate the authorization key or unique protection key with the device UUID. The authorization key may be requested during subsequent authentication processes from the Bluetooth enabled device 406 for user authentication, as will be described in further detail below. In step 518, the Bluetooth enabled device authentication control application may publish an authentication or service record making the created authentication information available for request.

As with the embodiments described above, general Bluetooth discovery may be completed between the configuration utility of the computer storage device 402 and the Bluetooth enabled device 406 in step 504. That is, the Bluetooth enabled device 406 may be identified, such as by its Bluetooth name and address, which are published for discovery. Upon identification of the Bluetooth enabled device 406, the computer storage device 406 may store the Bluetooth name and address of the Bluetooth enabled device 406, along with any other desirable and available identifying information. In some embodiments, any of the stored information for the Bluetooth enabled device 306 may be hashed and/or used to create a unique protection key used to protect the data encryption key for a computer storage device that is encrypted.

Subsequently, in step 520, the configuration utility of the computer storage device 402 may request the Fixed_UUID from the Bluetooth enabled device 406, for example, via the host computing device 404, to obtain the associated device UUID. As stated above, the Fixed_UUID may be a constant UUID across all computer storage devices and known to both the configuration utility and the Bluetooth enabled device authentication control application, and thus, as may be recognized by those skilled in the art, can be particularly suitable for setup purposes. Once the device UUID is received by the configuration utility of the computer storage device 402, in step 522, the configuration utility may use the device UUID to request the authorization key associated therewith from the Bluetooth enabled device 406. Upon receipt of this information from the Bluetooth enabled device authentication control application, in step 524, the computer storage device 402 may store the device UUID and the authorization key or authorization protection key, or both. In some embodiments, any of the stored information received from the Bluetooth enabled device authentication control application may be hashed.

In some embodiments, the authorization key may be a fixed key. However, in other embodiments, the authorization key may be automatically changeable, such as but not limited to, a time-based password that would cycle through a known or predetermined listing of passwords and/or automatically generated or non-predetermined passwords. The latter embodiment could further assist in preventing access via stolen or copied devices or authentication information, such as via "sniffing" valid authentication information.

Once the authentication information is formed to create a unique authentication protection key and is stored encrypted on the computer storage device 402, in step 526, the configuration utility may provide an indication that the setup, on the computer storage device side, has been completed. In one embodiment, it may provide such an indication by halting publication of the computer storage device Fixed_UUID information. As such, the Bluetooth enabled device authentication control application may determine the setup is complete on the computer storage device side by requesting the Fixed_UUID. If the Fixed_UUID is not available, the Bluetooth enabled device authentication control application may conclude that the setup on the computer storage device side is complete. However, it is recognized that an indication that the setup on the computer storage device has completed may be provided in any other suitable manner or may not be provided at all.

Subsequently, in step 528, the information relating to the Fixed_UUID on the Bluetooth enabled device authentication control application may be deleted. Deleting the information relating to the Fixed_UUID on the Bluetooth enabled device 406 may increase security and prevent Bluetooth sniffers from obtaining such information, and using it to determine the device UUID and authorization key.

This may complete initial setup of the authentication relationship between the computer storage device 402 and the Bluetooth enabled device 406. However, it is recognized that any additional steps may be included as desired for the setup process, including steps for setup of any other characteristics of the computer storage device 402 or setup of any characteristics of subsequent authentication processes, such as but not limited to the strength and/or type of authentication desired, as described above. The setup process, or portions thereof, may be repeated for setting up and associating any number of desired Bluetooth enabled devices 406 with the computer storage device 402. Similarly, the setup process, or portions thereof, may be repeated for setting up and associating any number of computer storage devices 402 with a single Bluetooth enabled device 406.

Figure 4A:
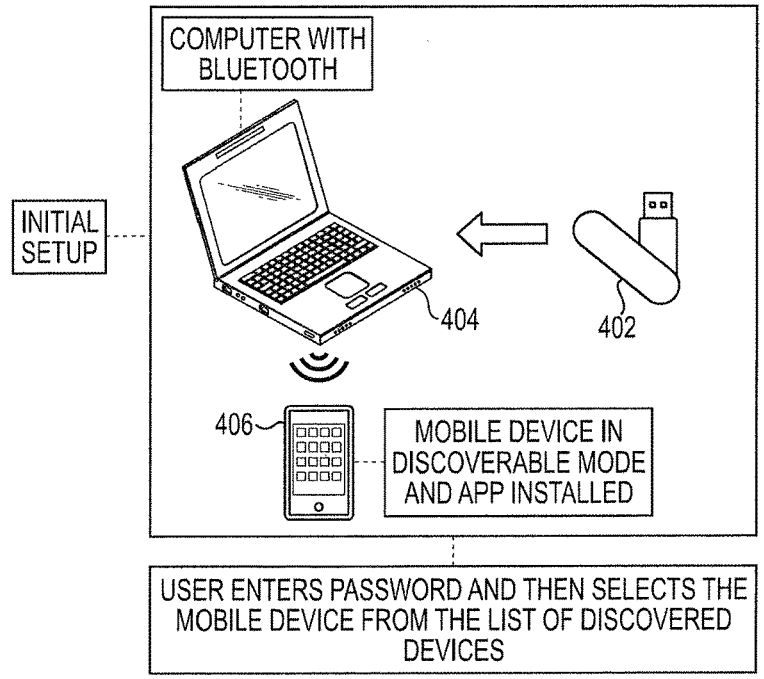
FIG. 4A is a diagram of a setup procedure for an authentication system in accordance with another embodiment of the present disclosure.
Figure 4B:
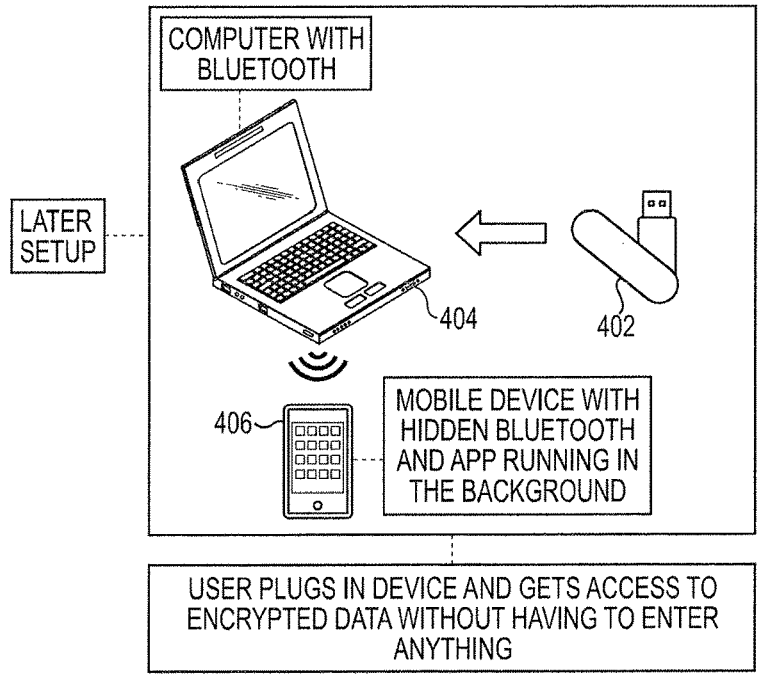
FIG. 4B is a diagram of an authentication procedure for an authentication system in accordance with another embodiment of the present disclosure.

As illustrated in FIG. 4B, to later use the Bluetooth enabled device 406 as the authentication factor for accessing the computer storage device 402, the user may initially operably couple the computer storage device to a host computing device 404, which may or may not be the same host computing device as used for setup. As discussed above, the computer storage device 402 may include any software for performing authentication procedures; however, it is also recognized that the host computing device 404 may alternatively or additionally be configured with all or part of the software utilized for the authentication procedures. If the host computing device 404 has a Bluetooth device (or if the computer storage device itself includes a Bluetooth device), the software may search the computer storage device 402 for any stored Bluetooth addresses of Bluetooth enabled devices that can be used for "something you have" authentication.

Similar to the embodiments discussed above, and as illustrated in step 506 of FIG. 5B, the software may cause the Bluetooth module or device of the host computing device 404 to send a Bluetooth request for the Bluetooth name associated with a Bluetooth address stored in the computer storage device. If a Bluetooth enabled device 406 with the Bluetooth address identified in the Bluetooth request sent from the host computing device 404 is in Bluetooth range, or other specified range, of the host computing device and running a Bluetooth function, application, or program for checking for and identifying a Bluetooth request, such as from the host computing device 404, then such Bluetooth enabled device may respond to the Bluetooth request with its Bluetooth name, as illustrated in step 508. As discussed previously, in some embodiments, the application may be run substantially continuously or may be switched on/off by the user, such that the user can control when the application is running. In further embodiments, the application can be configured for running in the background of other operations. If the Bluetooth name received from the Bluetooth enabled device 406 matches the Bluetooth name stored on the computer storage device 402 and associated with the Bluetooth address of the Bluetooth request, the Bluetooth enabled device may be accepted as a valid Bluetooth enabled device. Subsequently, in step 530, the software may cause the Bluetooth module or device of the host computing device 404 to send a Bluetooth request for the authorization key associated with the validated Bluetooth enabled device and the device UUID stored in the computer storage device. If the authorization protection key received from the Bluetooth enabled device 406 matches the authorization protection key stored on the computer storage device 402 and associated with the device UUID of the Bluetooth request, access to one or both of the computer storage device and its encryption key used to encrypt and decrypt data transmitted to and from the device may be granted to the user. In other embodiments, the validation of the Bluetooth enabled device via Bluetooth address and name may be eliminated and user authentication via the Bluetooth enabled device may be carried out using the device UUID and authorization key without validating the Bluetooth device. During these communications, the Bluetooth enabled device 406 may be operating in a non-discoverable mode, such that the Bluetooth enabled device is not generally identifiable to other Bluetooth enabled devices performing discovery functions. As discussed above, however, the Bluetooth enabled device 406 is still able to receive and respond to Bluetooth requests while non-discoverable. Such mode can be desirable where the user does not want the Bluetooth enabled device 406 to be identifiable by other Bluetooth systems while providing authentication information. The entire authentication process may be automatic and require no user interaction, except optionally bringing the Bluetooth enabled device in proximity to the computer storage device and/or host computing device. However, in other embodiments, the user may be required to interact or provide manual instruction for any portion of the process. If no Bluetooth name received from a Bluetooth enabled device matches up with a Bluetooth name associated with the Bluetooth address of that Bluetooth enabled device stored on the computer storage device, and/or the authorization key received from a Bluetooth enabled device does not match up with the authorization key associated with the device UUID stored on the computer storage device, then generally no authentication via "something you have" factors will be granted. However, as discussed above, in some embodiments, "something you know" authentication, such as via password authentication, may be utilized as a back-up authentication.

In additional embodiments, the Bluetooth enabled device authentication control application may be used to further control access to the computer storage device by permitting a user to, for example but not limited by, enable and disable access to a paired computer storage device associated with the Bluetooth enabled device 402 or Bluetooth enabled device authentication control application. Similarly, the Bluetooth enabled device authentication control application may be used to delete specified computer storage device pairings.

As discussed above, in some embodiments, the Bluetooth enabled device authentication control application may desirably include further measures, such as creation of a unique authorization protection key to protect against unauthorized access to protected and encrypted data stored on the computer storage device, for example, in case both the Bluetooth enabled device 406 and computer storage device 402 are stolen, since in such a case, the data or applications stored on the computer storage device could be accessed with single factor "something you have" authentication. Accordingly, the Bluetooth enabled device authentication control application may include a timeout period or timestamp or otherwise be configured to monitor another identifiable event or characteristic, where upon expiration of the timeout period or identification of the event, the Bluetooth enabled device will no longer provide authentication information without further interaction from the user to reset the timeout period or event. For example, a timeout period may be set for a certain number of days, such that after the specified number of days, the Bluetooth enabled device will no longer transmit the authentication information until the user interacts with the Bluetooth enabled device, such as but not limited to, by providing a password or other known information. Of course, the timeout period could be adjustable and may be set to any suitable duration of time, for example but not limited to, from any number of seconds to any number of days, and could even be set to never expire, if so desirable. As an additional example, the Bluetooth enabled device authentication control application could be set up to publish the service information only for a limited time after the user starts the application. In this way, the authentication information would be available generally only during a time period that the user expects or desires to use the authentication information. A Bluetooth enabled device with such additional security measures could provide additional security where a Bluetooth enabled device is lost or stolen. However, such example embodiments would generally involve some user interaction, which may not be desirable in all cases.

In still another embodiment, it is possible to create a full Bluetooth communication connection between two Bluetooth enabled devices, such as the host computing device 204 and Bluetooth enabled device 206 described above, and transmit and receive data back and forth without pairing the devices. This form of communication, however, was generally provided in only early Bluetooth devices and is only available as an unencrypted communication channel; accordingly, such devices may be susceptible to security breaches. While, in some cases, particularly where a certain level of security and/or encryption is desirable, important, or required, such form of Bluetooth connection may not be as desirable as some of the above, generally more secure embodiments, it is recognized that such unencrypted Bluetooth communication may nonetheless be utilized to allow the creation of unique hashed values, used to create a unique authentication protection key that is used to gain access to an encrypted computer storage device 204 via a Bluetooth enabled device 206. However, most implementations of Bluetooth today, particularly with respect to mobile phone devices, no longer permit creating a channel without pairing.

While discussed with respect to fixed and portable or removable storage media or devices, it is understood that such authentication systems and methods disclosed herein may be similarly utilized with storage media or devices that are non-removable and or with cloud-based storage media. For example, software could be running as part of a web browser application to authenticate a Bluetooth device or Bluetooth enabled device prior to permitting access to the cloud data. Additionally, while discussed above as generally permitting access to the storage device, it is recognized that the computer storage device could be configured to permit access to only a subset or particular partition of the memory of the storage device, and the embodiments described herein are not limited to permitting access to the entire storage device. Also, while the communication method is generally referred to herein as Bluetooth communication, other communication methods and protocols, currently existing or to be developed, could be used with the present invention.

In any of the above embodiments, multiple users and multiple Bluetooth devices may also be supported. Thus, authentication of multiple individual users may be supported, and each use may be authenticated by or using one or more individual Bluetooth devices.

For example, where two factor authorization may be mandatory (e.g., authentication requiring a password plus a Bluetooth enabled device), the use of multiple Bluetooth enabled authorization devices may make it possible to authenticate a corresponding computer storage device, even where two factor authentication is utilized and one of more of the devices (e.g., cell phones, smartphones, tablet computers, or dedicated Bluetooth authorization devices) is lost. In addition, multiple users may share protected data on a particular computer storage device, using multiple Bluetooth enabled authentication devices provided to different users.

An exemplary authentication file supporting multiple users may have entries using a form such as "username: type:salt:hash," where the "username" field is the login name of the user being authenticated. The "type" field indicates whether the entry is for a password ("pw") or Bluetooth device ("bt"). The "salt" entry indicates entropy or random data (e.g., 128 bits) to strengthen the password or Bluetooth hash, and the "hash" field indicates the results of hashing the salt plus password or Bluetooth device name.

An exemplary file structure is shown in Table 1, for multiple (e.g., two) users "Alice" and "Bob," as indicated in index entries 1-7. The two users have both password ("pw") and Bluetooth ("bt") entries, with randomized or generated salt fields to strengthen the resulting hash fields, as described above.

TABLE 1

| Index | Entry |
|-------|-------|
| 1 | Alice:pw:Uekah2oo:ExooNiOaiehohde9 |
| 2 | Alice:bt:Wokai7ew:jaomocuHhei1Jie7 |
| 3 | Alice:bt:vaeph70a:eiRieMo6eiT4thee |
| 4 | Alice:bt:SaNgaet5:DaiOaequuheiOPho |
| 5 | Bob:pw:Ohsu2bah:EiDlphuSOQuo4ooB |
| 6 | Bob:bt:UtaiMOfa:Ije3piuOyaiG6tee |
| 7 | Bob:bt:neeF4iet:eces7ZilAipheiz6 |

In addition, while discussed with respect to particular methods including a variety of steps in a particular order, it is recognized that any of the methods disclosed herein could include fewer or additional steps than those disclosed herein. Similarly, the steps of the disclosed method need not necessarily be performed in the order disclosed, but may be performed in any order.

In the foregoing description, various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

We claim:

1. A system for secure user authentication comprising:
a portable data storage device operably coupled with a host computing device, at least one of the portable data storage device or the host computing device being Bluetooth enabled, the portable data storage device comprising memory configured to store authentication information for access thereto, wherein the portable data storage device is a removable data storage device; and
a portable Bluetooth enabled authentication device operable in a non-discoverable mode and configured to provide the authentication information to the portable data storage device via the host computing device for access to data stored on the portable data storage device through the host computing device, wherein the secure user authentication is required prior to access to the data stored on the portable data storage device;
wherein access to the data stored on the portable data storage device is permitted via Bluetooth communication of the authentication information between the portable Bluetooth enabled authentication device and the at least one Bluetooth enabled portable data storage or host computing device, when the portable Bluetooth enabled authentication device is detected within a maximum Bluetooth range of the at least one Bluetooth enabled portable data storage or host computing device;
wherein the portable Bluetooth enabled authentication device is able to receive and respond to Bluetooth requests while non-discoverable, wherein the portable Bluetooth enabled authentication device operates in the non-discoverable mode such that the portable Bluetooth enabled authentication device is not identifiable to other Bluetooth enabled devices performing discovery functions; and
wherein the Bluetooth communication of the authentication information is performed with the portable Bluetooth enabled authentication device operating in the non-discoverable mode to establish the secure user authentication absent Bluetooth pairing between the portable Bluetooth enabled authentication device and the at least one Bluetooth enabled portable data storage or host computing device.

2. The system of claim 1, wherein the authentication information comprises a Bluetooth name and address of the portable Bluetooth enabled authentication device stored on the portable data storage device.

3. The system of claim 2, wherein the Bluetooth communication comprises transmission from the at least one Bluetooth enabled portable data storage or host computing device of the Bluetooth name of the portable Bluetooth enabled authentication device.

4. The system of claim 1, wherein the authentication information comprises a unique identifier and an authentication key for the portable Bluetooth enabled authentication device.

5. The system of claim 4, wherein the Bluetooth communication comprises transmission of the authentication key from the portable Bluetooth enabled authentication device to the at least one Bluetooth enabled portable data storage or host computing device.

6. The system of claim 5, wherein the authentication key is automatically cycled between a plurality of such authentication keys.

7. The system of claim 1, wherein the portable data storage device comprises a USB flash drive.

8. The system of claim 1, wherein the portable Bluetooth enabled authentication device comprises a mobile phone or smartphone.

9. The system of claim 1, further comprising an authentication control application loaded on the portable Bluetooth enabled authentication device, the authentication control application executable to set the portable Bluetooth enabled authentication device to discoverable mode and request a unique identifier from the portable data storage device.

10. The system of claim 1, wherein the maximum Bluetooth range is a predetermined configured range of less than five meters.

11. The system of claim 1, wherein the maximum Bluetooth range is limited only by Bluetooth capabilities of the portable Bluetooth enabled authentication device and the at least one Bluetooth enabled portable data storage or host computing device.

12. The system of claim 1, wherein the Bluetooth requests comprise a request for a Bluetooth name associated with a Bluetooth address of the portable Bluetooth enabled authentication device, the Bluetooth name stored in the portable data storage device.

13. A system for secure user authentication, the system comprising:
a configuration utility for setting up a portable Bluetooth enabled authentication device as an authentication factor for access to at least a portion of memory on a portable data storage device operably coupled to a host computing device, the portable Bluetooth enabled authentication device operable in a non-discoverable mode, wherein the portable data storage device is a removable data storage device;
authentication information stored on the portable data storage device for the portable Bluetooth enabled authentication device set up as the authentication factor; and
an access module permitting access to the at least a portion of the memory on the portable data storage device through the host computing device via Bluetooth communication of the authentication information between the portable Bluetooth enabled authentication device and the portable data storage device via the host computing device to which the portable data storage device is operably coupled, the at least one portable data storage or host computing device being Bluetooth enabled, when the portable Bluetooth enabled authentication device is detected within no more than a Bluetooth range of the at least one of the portable data storage or host computing device;
wherein the portable Bluetooth enabled authentication device is able to receive and respond to Bluetooth requests while non-discoverable, wherein the portable Bluetooth enabled authentication device operates in the non-discoverable mode such that the portable Bluetooth enabled authentication device is not identifiable to other Bluetooth enabled devices performing discovery functions; and wherein the Bluetooth communication of the authentication information is performed with the portable Bluetooth enabled authentication device operating in the non-discoverable mode to establish the secure user authentication absent Bluetooth pairing between the portable Bluetooth enabled authentication device and the at least one Bluetooth enabled portable data storage or host computing device, wherein the secure user authentication is required prior to the access.

14. The system of claim 13, wherein the authentication information comprises the Bluetooth name and address of the portable Bluetooth enabled authentication device stored on the portable data storage device.

15. The system of claim 14, wherein the Bluetooth communication comprises transmission from the at least one Bluetooth enabled portable data storage or host computing device of the Bluetooth name of the portable Bluetooth enabled authentication device.

16. The system of claim 13, wherein the authentication information comprises a unique identifier for the portable Bluetooth enabled authentication device and an authentication key.

17. The system of claim 16, wherein the Bluetooth communication comprises transmission from the portable Bluetooth enabled authentication device of the authentication key to the at least one of the portable data storage or host computing device.

18. The system of claim 17, wherein the authentication key is automatically cycled between a plurality of such authentication keys.

19. The system of claim 13, wherein the portable data storage device comprises an archival storage system operably coupled to the host computing device over a network.

20. The system of claim 19, wherein the portable data storage device comprises a cloud storage device, and wherein the portable Bluetooth enabled authentication device is accessed via an application installed on the host computing device.

21. The system of claim 19, wherein the portable Bluetooth enabled authentication device is within the Bluetooth range of the host computing device.

22. The system of claim 19, wherein the portable Bluetooth enabled authentication device is outside of the Bluetooth range of the portable data storage device.

23. The system of claim 13, wherein the Bluetooth requests comprise a request for a Bluetooth name associated with a Bluetooth address of the portable Bluetooth enabled authentication device, the Bluetooth name stored in the portable data storage device.

24. A method for secure user authentication comprising:
permitting access to data stored on a portable data storage device operably coupled to a host computing device when a portable Bluetooth enabled authentication device is brought within a Bluetooth range of the portable data storage device or the host computing device, the portable Bluetooth enabled authentication device operable in a non-discoverable mode and configured to provide authentication information and at least one of the portable data storage device or the host computing device being Bluetooth enabled, the portable data storage device comprising memory configured to store the authentication information for access thereto, wherein the portable data storage device is a removable data storage device;

wherein permitting access to the data stored on the portable data storage device comprises Bluetooth communication of the authentication information from the portable Bluetooth enabled authentication device to the portable data storage via the host computing device when the portable Bluetooth enabled authentication device is detected within the Bluetooth range;

wherein the portable Bluetooth enabled authentication device is able to receive and respond to Bluetooth requests while non-discoverable, wherein the portable Bluetooth enabled authentication device operates in the non-discoverable mode such that the portable Bluetooth enabled authentication device is not identifiable to other Bluetooth enabled devices performing discovery functions; and wherein the access is permitted to the portable data storage device based on the Bluetooth communication of the authentication information with the portable Bluetooth enabled authentication device operating in the non-discoverable mode to establish the secure user authentication absent Bluetooth pairing between the portable Bluetooth enabled authentication device and the at least one of the portable data storage or host computing device, wherein the secure user authentication is required prior to access to the data through the host computing device.

25. The method of claim 24, further comprising receiving from the portable Bluetooth enabled authentication device, and storing in the memory of the portable data storage device, the authentication information for access to the portable data storage device when the portable Bluetooth enabled authentication device is brought within the Bluetooth range of the at least one of the portable data storage or host computing device.

26. The method of claim 25, wherein at least a portion of the authentication information comprises an authorization key generated by the portable Bluetooth enabled authentication device.

27. The method of claim 24, further comprising providing a plurality of such portable Bluetooth enabled authentication devices to a plurality of users for authenticating each of the users to access the portable data storage device.

28. The method of claim 27, wherein permitting access to the portable data storage device comprises authenticating at least one of the users based on the user bringing any one of the plurality of portable Bluetooth enabled authentication devices within no more than the Bluetooth range of the at least one of the portable data storage or host computing device.

29. The method of claim 27, further comprising generating an authentication file for authorization of each of the plurality of users for access to the portable data storage device.

30. The method of claim 29, wherein the authentication file comprises a plurality of entries, each of the entries having a user field for identifying at least one of the plurality of users.

31. The method of claim 30, wherein each of the plurality of entries in the authentication file comprises a type field for identifying a password or Bluetooth name of the entry for each of the at least one identified users.

32. The method of claim 31, wherein each of the plurality of entries in the authentication file further comprises a hash field comprising a hash of the type field.

33. The method of claim 32, wherein each of the plurality of entries in the authentication file further comprises a salt field comprising data for strengthening the hash field, and wherein the hash field indicates results of hashing the salt field plus the type field identifying the password or Bluetooth name.

34. The method of claim 24, wherein the Bluetooth requests comprise the host computing device sending a request for a Bluetooth name associated with a Bluetooth address of the portable Bluetooth enabled authentication device, the Bluetooth name stored in the portable data storage device.

35. The method of claim 5, wherein access to encrypted data on the portable data storage device is based on detection and recognition of unique device identification values collected from the portable Bluetooth enabled authentication device and established in a Bluetooth device setup and configuration utility included on the portable data storage device.

36. The method of claim 35, further comprising using the unique Bluetooth device identification values together as a set to allow for user authentication to access the encrypted data on the portable data storage device.

37. The method of claim 35, further comprising using the unique Bluetooth device identification values in individual pairings to allow for user authentication to access the encrypted data on the portable data storage device.

38. The method of claim 35, further comprising using the unique Bluetooth device identification values for single factor authentication to allow for automatic user authentication to access the portable data storage device.

39. The method of claim 35, further comprising hashing the unique Bluetooth identification values to create a unique authentication protection key stored on the portable data storage device, wherein the unique authentication protection key is used for protecting a data encryption key that provides access to the encrypted data on the portable data storage device.

40. The method of claim 39, further comprising providing automatic authentication services for user authentication to access the portable data storage device by carrying the portable Bluetooth enabled authentication device in close proximity to the portable data storage device without user-performed authorization steps.

41. The method of claim 40, wherein providing automatic authentication services is performed from an application running on one or both of the host computing device and the portable data storage device.

42. The method of claim 41, wherein the application identifies the portable Bluetooth enabled authentication device as a previously registered Bluetooth enabled device.

43. The method of claim 42, wherein the application identifies the previously registered Bluetooth enabled device using a unique Bluetooth device identification value of the previously registered Bluetooth enabled device.

44. The method of claim 42, further comprising unlocking the unique authentication protection key based on a match of the unique Bluetooth device identification value of the previously registered portable Bluetooth enabled authentication device to a Bluetooth name stored on the portable data storage device.

45. The method of claim 44, further comprising allowing access to the data encryption key by the application running on one or both of the host computing device and the portable data storage device for encrypting or decrypting files on the portable data storage device.

* * * * *

UNITED STATES PATENT AND TRADEMARK OFFICE
CERTIFICATE OF CORRECTION

PATENT NO. : 10,303,868 B2  
APPLICATION NO. : 13/728000  
DATED : May 28, 2019  
INVENTOR(S) : Mark P. Weber et al.

Page 1 of 1

It is certified that error appears in the above-identified patent and that said Letters Patent is hereby corrected as shown below:

In the Claims

Column 27, Line 13, Claim 35, Line 1:
"The method of claim 5"
Should read:
--The method of claim 24--

Signed and Sealed this
Seventeenth Day of March, 2020

Andrei Iancu
*Director of the United States Patent and Trademark Office*